Feb. 26, 1957     H. T. WILHELM     2,783,435
IMPEDANCE MEASURING MEANS
Filed May 10, 1955
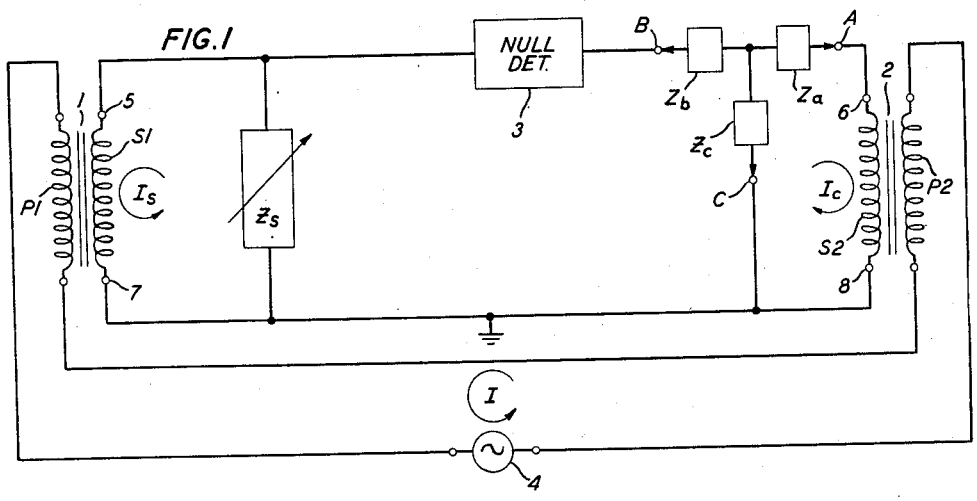
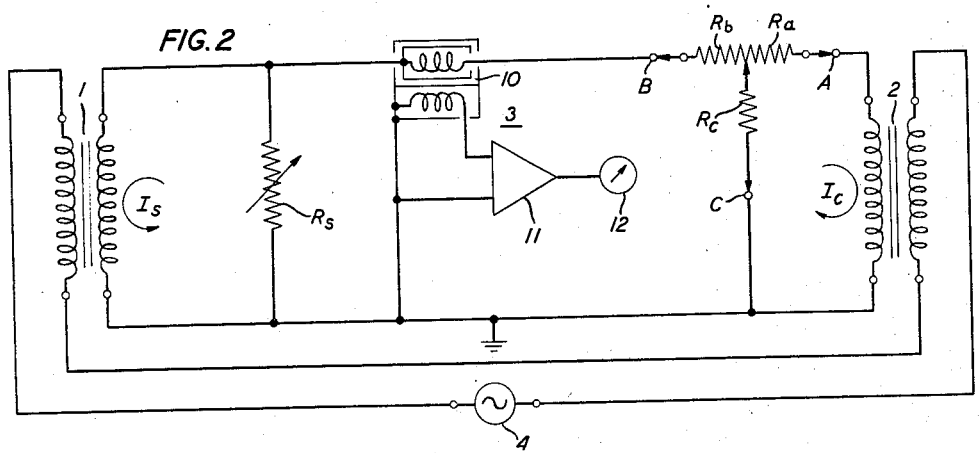
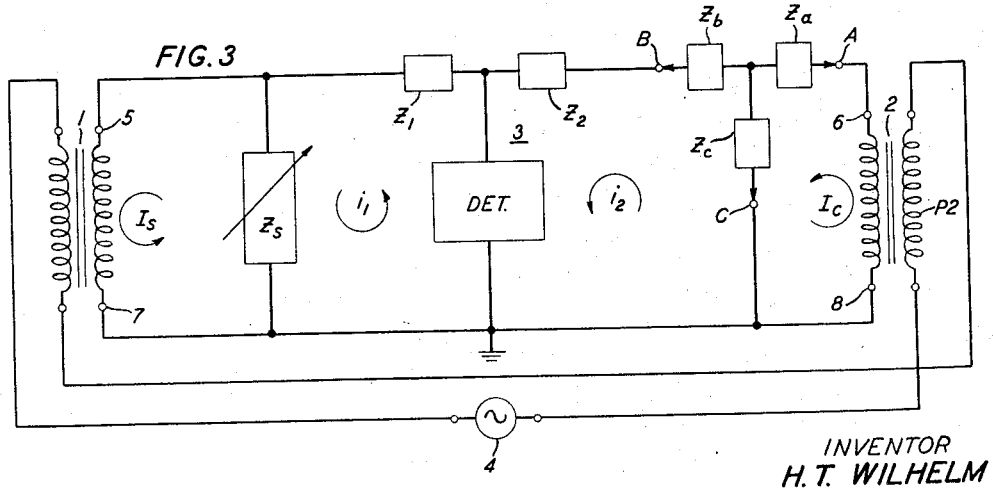
INVENTOR
*H. T. WILHELM*
BY *Walter M. Hill*
ATTORNEY

United States Patent Office 2,783,435
Patented Feb. 26, 1957

2,783,435

IMPEDANCE MEASURING MEANS

Henry T. Wilhelm, Summit, N. J., assignor to Bell Telephone Laboratories, Incorporated, New York, N. Y., a corporation of New York Application May 10, 1955, Serial No. 507,415

10 Claims. (Cl. 324—57)

This invention relates to the art of electrical measurement and more particularly to a means for measuring the impedances of the legs of a Y-connected impedance network.

Heretofore, measurements of this character have been made by making three successive measurements at the three terminals of the Y-connected network, taking in succession two of the terminals at a time. This method has three inherent disadvantages. First of all, it requires at least three times as much measuring time as does a single measurement. Secondly, the current distributions are frequently found to be different in successive measurements so that the impedance parameters are not always consistent and consequently errors result. The third disadvantage is that the method does not yield the desired impedance directly and additional time is required for computation. In the prior art, bridges have been proposed for making these measurements directly without computation and in a single measurement. These bridges are represented by such art as United States Patent 1,775,686, granted September 16, 1930, to Joseph W. Milnor. While such bridges offer a considerable advantage over the older method, they have the disadvantage of rather large power losses in the ratio arms resulting in a relatively small sensitivity.

It is the object of this invention to provide a very simple and improved means for measuring one leg of a Y-connected impedance network, which means yields the desired impedance in a single balance without computation, provides a greatly increased sensitivity over that obtainable by prior art structures and has a very low loss in the measuring circuit.

The foregoing object is achieved by this invention which provides a null circuit for measuring the impedance of one leg of a Y-connected network in which two closely coupled transformers have their primaries connected in series to a source of alternating current. The secondary windings are also connected in series and the standard impedance is connected across one of the secondary windings. Two of the three test terminals are connected, respectively, to the terminals of the other secondary winding and a null detector is connected between the standard impedance and the third test terminal. At null, the impedance of one leg of the Y network is directly measured by the standard impedance components and the ratio of the secondary currents, which ratio is automatically maintained constant by reason of the equality of primary currents and the close coupling between the windings in each of the two separate transformers. This ratio is preferably made either unity or some convenient power of ten. The invention may be better understood by referring to the accompanying drawings in which:

Fig. 1 discloses a preferred embodiment of the invention;

Fig. 2 shows the preferred embodiment of the invention specifically applied to the measurement of the contact resistance of a potentiometer and also discloses a specific form of null detector; and Fig. 3 shows the invention embodying an alternative form of detector network.

Referring now to Fig. 1, it will be noted that the invention comprises two transformers 1 and 2, each of which includes a primary winding and a secondary winding, respectively. The two primary windings P1 and P2 are shown connected in series and to a source of alternating current 4. Consequently, the same current is flowing in each of the primary windings. The secondary windings are closely coupled to their primaries so that the primary ampere-turns in each transformer is a very close approximation to the secondary ampere-turns. A standard impedance $Z_s$ is connected across the secondary terminals 5 and 7 of transformer 1. This standard impedance is preferably arranged for separate adjustment of its two impedance components. Its reactive component must be of the same kind as is the reactive component of the impedance $Z_c$ of the Y-connected network.

The Y-connected impedance network comprising impedances $Z_a$, $Z_b$ and $Z_c$ is shown connected between the three test terminals A, B and C. Test terminals A and C are connected, respectively, to terminals 6 and 8 of the secondary of transformer 2. A null detector 3 is connected between the third test terminal B and the upper end of the standard impedance network $Z_s$.

Because of the very close coupling in the two transformers, the current $I_c$ flowing through the secondary winding S2 of transformer 2 will remain substantially constant regardless of variations in the magnitude of impedances $Z_a$ and $Z_c$. Since impedance $Z_b$ is connected in series with the detector, it does not affect the correctness of the balance condition but affects only the sensitivity of the detector response. It will thus be evident that balance is achieved when the voltage drop across the standard impedance is equal to the voltage drop across the impedance $Z_c$ which comprises one leg of the network to be measured. Mathematically, this may be represented by the following expression:

$$Z_s I_s = Z_c I_c \qquad (1)$$

The unknown impedance $Z_c$ is therefore directly obtained from the above expression and is explicitly as follows:

$$Z_c = (I_s/I_c)Z_s \qquad (2)$$

Since the primary current I is the same for each primary winding, it is quite evident that the ratio of the secondary currents $I_s$ to $I_c$, as given in Expression 2 above, will be determined by the ratio between the turns ratios of the two transformers. This may be made either unity or some convenient power of ten and therefore may be used as a multiplying factor which is applicable to each of the components of the standard impedance.

In Fig. 2 the invention has been specifically applied to the measurement of the contact resistance of a potentiometer. In this case the standard impedance may be a pure resistance denoted $R_s$. The potentiometer network is a Y-connected network as shown in Fig. 2 and comprises three resistances $R_a$, $R_b$ and $R_c$. In this particular case resistances $R_a$ and $R_b$ have a constant sum equal to the resistance of the potentiometer card. Resistance $R_c$ is the contact resistance between the slider and the resistance element of the potentiometer. This network is shown connected between the three test terminals A, B and C and, except for the detector, the rest of the circuit is the same as shown in Fig. 1.

The detector 3 of Fig. 1 may be the same as more particularly disclosed in Fig. 2 or it may be of any other convenient, conventional design. As shown in Fig. 2 however, this detector comprises a shielded transformer 10, an amplifier 11 and an indicator 12. Ordinarily, in dicator 12 will be a direct-current responsive instrument in which case amplifier 11 should also include a suitable rectifier in accordance with conventional practice. The primary winding of transformer 10 is shown connected between test terminal B and the upper end of the standard resistance $R_s$. The secondary is connected to the input terminals of amplifier 11. The shielding arrangement is in accordance with well-established conventional practice. At this point it might be mentioned that it is generally preferable to connect the lower ends of the two secondary windings of transformers 1 and 2, one terminal of the secondary of transformer 10 and the outer shield to a common ground connection.

The balance relation for the network of Fig. 2 is similar to that given above for Fig. 1. In the case where the turns ratios of the two transformers are equal, the two secondary currents $I_c$ and $I_s$ will be automatically maintained substantially equal by reason of the transformer action previously described. This will be true regardless of any reasonable variation in the value of the resistor $R_s$. Consequently, under the conditions assumed, resistor $R_c$ will be equal to $R_s$ when the null indicator indicates balance. It will thus be evident that this invention directly measures the impedance of one leg of a Y-connected impedance network in a single measurement. Since the transformers can easily be made with very low losses, the sensitivity of the instrument is greatly increased and in fact it can be made better than the sensitivity of a resistance bridge by a ratio of the order of 100 to 1. The advantages flowing from such increased sensitivity are obvious.

The detector arrangement shown in Fig. 2 is preferred for the practice of this invention. However, it is possible that other types of detectors may be employed. For example, the detector network of Fig. 3 is of the type shown in United States Patent 2,607,827, granted August 19, 1952, to John H. Mennie. A disadvantage in this type of detector inheres in its lack of sensitivity as compared with the type shown in Fig. 2. The measuring network of Fig. 3 is the same as in Fig. 1 but the detector comprises two similar impedances $Z_1$ and $Z_2$ with a voltage responsive detection means connected between their junction and ground. It is a requirement that impedance $Z_2$ be large compared with the impedance $Z_b$ of the network under measurement. With impedances $Z_1$ and $Z_2$ equal and assuming a unity ratio between the turns ratios of the two transformers, a null condition is achieved when the standard impedance $Z_s$ is equal to the impedance $Z_c$ of the network leg connected to terminal C. An analysis of the network will reveal that impedances $Z_1$ and $Z_2$ should be of the same kind and may be made unequal so as to be used as the multiplying factor. The balance equation is:

$$Z_c = (Z_2/Z_1) Z_s \qquad (3)$$

Also, it will be noted that, because of the nature of this particular type of detector, the currents in the two meshes of the detector must flow in opposite directions through the detector as shown for currents $i_1$ and $i_2$ in Fig. 3. This requires that the phase of one of the transformers be reversed as symbolically indicated by the exchange of connections to the primary $P_2$ of transformer 2.

It will be evident to any one skilled in the art that it is a primary requirement for the practice of this invention that the ratio between the secondary currents of the two transformers must be maintained constant regardless of any variation in the impedance $Z_a$ connected in circuit with the leg of the network to be measured. Automatic equalization of these currents is brought about by reason of the use of two separate transformers each having a close coupling between its windings and the fact that the primary windings are connected in series to the source of alternating current so that the two primary currents are always exactly equal. The invention is not to be regarded as restricted to any particular kind of detector network as it will be evident to those skilled in the art that a great variety of detectors may be used to indicate the condition of equality between the voltage drops across the standard and the unknown impedances.

What is claimed is:

1. Means for measuring the impedance of one leg of a Y-connected network comprising two transformers, a secondary winding on each transformer, means joining said windings in series relation, a standard impedance connected between the junction of the two windings and the free terminal of one of them, three test terminals for connecting to said network, one test terminal connected to said junction, a second test terminal connected to the free terminal of the other winding, a null detector connected between said first-mentioned free terminal and the third test terminal, a primary winding on each transformer closely coupled to its secondary, and means for connecting said primary windings in series and to a source of alternating current.

2. The combination of claim 1 wherein said null detector comprises a transformer having at least two windings, one winding connected between said first-mentioned free terminal and said third test terminal and another winding coupled to a voltage responsive indicator.

3. The combination of claim 1 wherein said null detector comprises two similar impedances connected in series between said first-mentioned free terminal and said third test terminal, and a voltage responsive indicator connected between said junction and the junction between said two similar impedances.

4. The combination of claim 1 wherein said standard impedance comprises a resistive component and a reactive component, the latter being of the same kind as the reactive component of the impedance leg to be measured.

5. Means for measuring the impedance of one leg of a Y-connected network comprising three test terminals for connection to said network, a standard impedance having two terminals, a connection joining one of said test terminals to one standard impedance terminal, transformer means connected to pass one current through said standard impedance and another current through the network under test between said one test terminal and a second test terminal, said transformer means being so constructed and arranged as to maintain a substantially constant ratio between said two currents, and a null detector connected between said third test terminal and a terminal of said standard impedance to indicate voltage equality when the voltage drop across the standard impedance is equal to that across one leg of the network to be measured.

6. The combination of claim 5 wherein said transformer means comprises two separate transformers, each having a primary winding closely coupled to a secondary winding, means connecting one secondary winding to the terminals of the standard impedance and the other secondary winding to said one test terminal and to said second test terminal, and means connecting said primaries in series whereby a substantially constant ratio of currents may be caused to flow in said secondaries independent of any difference in the impedances connected to said two secondary windings.

7. The combination of claim 5 wherein said null detector comprises a two winding transformer, the primary winding of which is connected between said third terminal and the standard impedance, electrostatic shielding means between said windings, a grounded shield surrounding said transformer, and a voltage responsive indicator coupled to the secondary winding.

8. The combination of claim 5 wherein said standard impedance comprises a resistive component and a reactive component, the latter being of the same kind as the reactive component of the impedance leg to be measured.

9. Means for measuring the impedance of one leg of a

Y-connected network comprising two closely coupled transformers each having a primary winding and a secondary winding, means for connecting the primary windings in series to a source of alternating current, means connecting the secondary windings in series, a standard impedance, means connecting the standard impedance across one of said secondary windings, means for connecting two terminals of said network across the other secondary winding, and a null detector connected to said standard impedance and having means for connection to the third terminal of said network.

10. The combination of claim 9 wherein the turns ratios of said transformers are to each other as a power of ten.

References Cited in the file of this patent

UNITED STATES PATENTS

| | | |
|---|---|---|
| 1,795,607 | Keinath et al. | Mar. 10, 1931 |
| 2,609,435 | Gerth | Sept. 2, 1952 |